US012798206B2

(12) United States Patent
Nusselder

(10) Patent No.: US 12,798,206 B2
(45) Date of Patent: Nov. 17, 2026

(54) METHOD FOR SWITCHING OVER A TIRE MANUFACTURING LINE, AND TIRE MANUFACTURING LINE AND COMPUTER PROGRAM PRODUCT CONFIGURED FOR THE SAME

(71) Applicant: VMI HOLLAND B.V., Epe (NL)

(72) Inventor: Robin Nusselder, Epe (NL)

(73) Assignee: VMI HOLLAND B.V., Epe (NL)

( * ) Notice: Subject to any disclaimer, the term of this patent is extended or adjusted under 35 U.S.C. 154(b) by 66 days.

(21) Appl. No.: 18/865,061

(22) PCT Filed: Apr. 12, 2023

(86) PCT No.: PCT/EP2023/059519

§ 371 (c)(1),
(2) Date: Nov. 12, 2024

(87) PCT Pub. No.: WO2023/222308

PCT Pub. Date: Nov. 23, 2023

(65) Prior Publication Data

US 2025/0312984 A1 Oct. 9, 2025

(30) Foreign Application Priority Data

May 18, 2022 (NL) ..................................... 2031909

(51) Int. Cl.
*B29D 30/00* (2006.01)

(52) U.S. Cl.
CPC .... *B29D 30/005* (2013.01); *B29D 2030/0055* (2013.01)

(58) Field of Classification Search
CPC .. B29D 30/005; B29D 30/0061; B29D 30/08; B29D 30/48; B29D 2030/0055; B29D 2030/487

(Continued)

(56) References Cited

U.S. PATENT DOCUMENTS 6,280,548 B1 8/2001 Benzing, II et al.
2002/0174939 A1 11/2002 Caretta et al.
2004/0238102 A1 * 12/2004 Girard .................. B29D 30/005 156/111

FOREIGN PATENT DOCUMENTS

CN 103930262 A 7/2014
EP 1481791 A2 12/2004

(Continued)

OTHER PUBLICATIONS

Dutch Search Report from corresponding Dutch Patent Application No. NL2031909, Jan. 19, 2023.

(Continued)

*Primary Examiner* — Sedef E Paquette

(74) *Attorney, Agent, or Firm* — Workman Nydegger

(57) ABSTRACT

A method for switching over a tire manufacturing line from a first manufacturing mode to a second manufacturing mode, the tire manufacturing line including a plurality of modules arranged in-line between an input side and an output side of the tire manufacturing line. The method comprises the steps of operating the plurality of modules in the first manufacturing mode, progressively switching over modules from the first to the second manufacturing mode, operating the modules that have been switched while simultaneously operating modules that have not been switched. The method further comprises the steps of providing a joint in a strip, and switching over at least one module from the first manufacturing mode to the second manufacturing mode at arrival of the joint.

30 Claims, 12 Drawing Sheets

(58) Field of Classification Search
USPC ............................... 156/110.1, 111, 117, 136
See application file for complete search history.

(56) References Cited

FOREIGN PATENT DOCUMENTS

| | | | |
|---|---|---|---|
| WO | 0189818 | A1 | 11/2001 |
| WO | 2016122344 | A1 | 8/2016 |

OTHER PUBLICATIONS

International Search Report from corresponding PCT Application No. PCT/EP2023/059519, Jul. 13, 2023.
Chinese Office Action from Corresponding Chinese Patent Application No. CN202380013518.6, Jul. 17, 2026.

* cited by examiner

METHOD FOR SWITCHING OVER A TIRE MANUFACTURING LINE, AND TIRE MANUFACTURING LINE AND COMPUTER PROGRAM PRODUCT CONFIGURED FOR THE SAME

BACKGROUND

The invention relates to a method for switching over a tire manufacturing line. The invention further relates to a tire manufacturing line and a computer program product configured for performing said method.

An example of a tire manufacturing line is a bead-apex manufacturing line for manufacturing bead-apexes. Said bead-apex manufacturing line comprises a plurality of modules arranged in-line between an input side and an output side of the tire manufacturing line. In particular, the bead-apex manufacturing line is provided with a raw material input module at the input side, an extruder module for converting raw material from the raw material input module into a continuous strip, a cutting module for cutting the continuous strip into individual apexes, an shaping module for shaping and assembling the individual apexes around a bead to form an assembled bead-apex, an inspection module for checking assembled bead-apexes and a storage module for storing the assembled bead-apexes. The bead-apex tire manufacturing line may further comprise one or more modules arranged in parallel or as a branch off section with respect to plurality the modules that arranged in-line, such as a bead supply module for suppling beads to the shaping module.

It is known to manufacture identical bead-apexes as part of a production order with identical settings, constant module configurations and a specific compound of raw material. Each production order may require different settings, configurations and/or compounds. The bead-apex manufacturing line thus needs to be switched over between production orders.

In a known method for switching over the bead-apex manufacturing line, the supply of raw material to the extruder module is stopped. Subsequently, a run-out procedure is initiated at the extruder module to flush out or clean out any remaining raw material. The remaining length of the continuous strip that is still within the tire manufacturing line is run through all of the modules to complete the old production order. Once the bead-apex manufacturing line is completely empty, each module is set up or reconfigured for the new production order and different beads are loaded into the bead supply module. Finally, a new compound of raw material can be loaded into the raw material input module and fed to the extruder module, after which the manufacturing process in the remaining modules of the bead-apex manufacturing line can be resumed for the new production order.

SUMMARY OF THE INVENTION

A disadvantage of the known method for switching over the bead-apex manufacturing line is that the old production order needs to be completed and the bead-apex manufacturing line needs to be completely empty before the new set up and/or reconfiguration of the modules can start. It typically takes at least thirty minutes to complete the switching over.

It is an object of the present invention to provide a method for switching over a tire manufacturing line and a computer program product configured for performing said method, wherein the switch over time can be reduced.

According to a first aspect, the invention provides a method for switching over a tire manufacturing line from a first manufacturing mode to a second manufacturing mode, wherein the tire manufacturing line comprises a plurality of modules arranged in-line between an input side and an output side of the tire manufacturing line, wherein the method comprises the steps of:

- operating the plurality of modules in the first manufacturing mode;
- progressively, from the input side towards the output side, switching over one or more modules of the plurality of modules from the first manufacturing mode to the second manufacturing mode; and
- operating the one or more modules that have been switched to the second manufacturing mode in said second manufacturing mode while simultaneously operating one or more modules that have not yet been switched over in the first manufacturing mode,
- wherein the tire manufacturing line is configured for converting a strip into individual tire components, wherein the method further comprises the steps of:
- providing a joint in the strip between a first part of the strip that is to be processed by one or more modules of the plurality of modules operating in the first manufacturing mode and a second part of the strip that is to be processed by one or more modules of the plurality of modules operating in the second manufacturing mode; and
- switching over at least one module of the plurality of modules from the first manufacturing mode to the second manufacturing mode prior to or at arrival of said joint in said at least one module.

By switching over the modules progressively, manufacturing can already start according to the second manufacturing mode while at least some of the modules are still operating in the first manufacturing mode. In other words, a production order related to the first manufacturing mode does not have to be completed when a new production order based on the second manufacturing mode is started. Hence, the switch over time can be reduced significantly. In particular, tests have shown that the switch over time can be reduced from thirty minutes to less than ten minutes, in particular less than five minutes. Furthermore, the first part of the strip and the second part of the strip can be joined so as to a form a continuous length of the strip. The strip can therefore progress through the tire manufacturing line as if it was a continuous strip. The at least one module can be switched over just in time for processing the second part of the strip according to the second manufacturing mode, while the first part of the same strip can still be processed according to the first manufacturing mode. Moreover, because of the joint, the leading end of the second part of the strip can be pulled into the tire manufacturing line in a controlled manner without requiring manual guiding or the like, and the trailing end of the first part of the strip is less likely to behave unpredictably compared to the known method in which said trailing end is a free end.

In fact, a further production order related to a third manufacturing mode may even be started when the new production order related to the second manufacturing mode has not yet been completed. In other words, the method may involve operating the tire manufacturing mode in two or more production modes at the same time.

Preferably, the method further comprises the step of:

operating all of the plurality of modules in the second manufacturing mode after all of the plurality of modules has been switched over to the second manufacturing mode. Hence, the entire tire manufacturing line can be progressively switched over to the second manufacturing mode.

In an embodiment thereof the method further comprises the steps of:

calculating progress of the joint through the tire manufacturing line from the input side towards the output side; and switching over the at least one module from the first manufacturing mode to the second manufacturing mode in response to the calculated progress. By calculating the progress, the at least one module can be switched over without detecting the actual progress of the joint in the tire manufacturing line.

In a further embodiment the progress is calculated based on rate of travel of the strip through the tire manufacturing line from the input side towards the output side. The rate of travel can be used to determine the length of the strip that has passed a certain position in the tire manufacturing line at a given moment in time. It is assumed that the joint, as part of the strip, has the same rate of travel. The tire manufacturing line may for example be provided with one or more encoders for monitoring the travel rate of conveyors, drums or the like.

Alternatively, the progress is calculated based on an elapsed time after an event in the tire manufacturing line. Assuming that at least some of the modules have a known processing time, the switch over of the at least one module can be timed based on the processing times of the modules upstream of said at least one module. In principal, calculating the progress based on the elapsed time does not require any sensors.

Preferably, the event is a time of creation of the joint or the event is related to the progress of joint through the tire manufacturing line upstream of the at least one module. The elapsed time since the time of creation of the joint can be used to control the switch over for any of the modules downstream of the module where the joint was created. However, the further downstream each module is, the more inaccurate such time-based control will become. By using the elapsed time since an event further downstream in the tire manufacturing line, for example the arrival or departure of the joint relative to a specific module, the time-based control can be made more accurate.

In another embodiment the method further comprises the steps of:

tracking progress of the joint through the tire manufacturing line from the input side towards the output side; and switching over the at least one module from the first manufacturing mode to the second manufacturing mode in response to the tracked progress. In this manner, the at least one module can be switched over based on the actual position of the joint in the tire manufacturing line, thereby preventing any theoretical miscalculations.

In another embodiment the method further comprises the steps of:

providing one or more sensors for detecting the progress of the joint through the tire manufacturing line from the input side towards the output side. Preferably, the one or more sensors comprises at least one of a height sensor, an optical sensor, an encoder, an imaging sensor or a radio frequency sensor. Each sensor can in its own way detect the joint, for example by detecting a height variation representative of said joint, by observing a color difference, by image recognition or by detecting a radio frequency of a marker, as discussed hereafter, attached to said joint.

In a further embodiment the method further comprises the steps of:

adding a marker to the strip at or near the joint; and tracking the progress of the joint through the tire manufacturing line by detecting the marker. The marker may improve the detectability of the joint. The marker may be attached to the joint with an adhesive, or it may be mechanically attached to the joint, for example through clamping. The marker may have a contrasting color or texture, or it may be provided with an actively detectable element, such as an RFID tag or the like.

Preferably, the method further comprises the steps of:

removing the marker from the strip; and adding the marker to another strip during a subsequent cycle of the method. Hence, the marker can be used repeatedly.

In another embodiment the strip, at the joint, has one of a height transition, a shape transition, a material transition, a color transition, a texture transition or another observable transition. The observable transition makes it possible to detect said joint without using the aforementioned marker.

In another embodiment the plurality of modules comprises an extruder module for extruding the strip, wherein the method comprises the steps of:

operating the extruder module in the first manufacturing mode to extrude the first part of the strip;

switching over the extruder module from the first manufacturing mode to the second manufacturing mode; and operating the extruder module in the second manufacturing mode to extrude the second part of the strip. Switching over the extruder module normally takes between two and five minutes. In the known method, the extruder can only start operating in the second manufacturing mode after the manufacturing line is completely empty. In contrast, in the method according to the present invention, the extruder module can already start operating in the second manufacturing mode when at least some of the modules downstream of the said extruder module are still operating in the first manufacturing mode, thus saving considerable switch over time.

Preferably, the method further comprises the steps of:

running out the first part of the strip from the extruder module, wherein the first part of the strip comprises a run-out section as a result of said running out; and at least partially removing the run-out section from the first part of the strip prior to joining the first part of the strip with the second part of the strip. Typically, the run-out section is not suitable for production and needs to be discarded as waste. By removing the run-out section prior to joining, it can be prevented that said run-out section has to be removed in a module further downstream along the tire manufacturing line where such removal is potentially more complicated and/or more time consuming.

In a further embodiment the plurality of modules comprises a buffer module downstream of the extruder module, wherein the method comprises the steps of:

buffering a buffer length of the first part of the strip in the buffer module prior to the switch over the extruder module from the first manufacturing mode to the second manufacturing mode; and feeding out at least a part of the buffer length of the first part of the strip from the buffer module to one or more modules of the plurality of modules downstream of the buffer module during the switch over the extruder module from the first manufacturing mode to the second manufacturing mode. The buffer length of the first part of the strip can be effectively accumulated in the buffer module in preparation for a switch over of the extruder module, such that the feeding of the first part of the strip to modules downstream of said buffer module can be kept continuous or substantially continuous for as long as possible, despite the interruption at the extruder module. Note that the buffer length may not be sufficient to keep feeding the first part of the strip into the manufacturing line during the entire switch over of the extruder module, but it can at least significantly reduce any downtime of the tire manufacturing line downstream of the buffer module. Moreover, the buffer module can keep the trailing end of the first part of the strip stationary at or near said extruder module for joining with the leading end of the second part of the strip while the buffer length of the first part of the strip is still being fed downstream into the tire manufacturing line.

In another embodiment the plurality of modules comprises a cutting module, wherein the method further comprises the steps of:

cutting the strip into individual tire components from the first part of the strip at the cutting module;

switching over the cutting module from the first production mode to the second production mode; and cutting the strip into individual tire components from the second part of the strip at the cutting module.

In one preferred embodiment the method further comprises the step of:

cutting out the joint from the strip. The joint is unsuitable for production. By cutting out said joint, it can be prevented that the joint ends up in the tire components manufactured in said tire manufacturing line.

In another preferred embodiment, the first part of the strip comprises a run-out section adjacent to the joint, wherein the method further comprises the step of:

at least partially cutting out the run-out section at the cutting module. The run-out section is unsuitable for production. By cutting out said run-out section, it can be prevented that the run-out section ends up in the tire components manufactured in said tire manufacturing line.

In another embodiment the method further comprises the steps of:

calculating a theoretical length of the first part of the strip that is required to complete a first production order of tire components manufactured in the tire manufacturing line from said first part of the strip; and starting the switch over of the plurality of modules from the first manufacturing mode to the second manufacturing mode after an actual length of the first part of the strip in the tire manufacturing line is equal to or greater than the theoretical length. Hence, it can be ensured that the first production order can be completed with the actual length of the first part of the strip remaining in the tire manufacturing line at the moment of the switch over.

In another embodiment one or more modules of the plurality of modules are switched over from the first manufacturing mode to the second manufacturing mode automatically, semi-automatically or manually. The automatic switch over does not require human intervention, whereas the semi-automatic switchover may require some manual preparation or a manual input from a human operator. A manual switch over is may for example involve manually exchanging the die at the extruder module or manually exchanging storage carts at the output side of the tire manufacturing line.

By way of example, switching over the plurality of modules may comprise one or more of the following steps:

supplying one or more different compounds to an extruder;

changing an extruder configuration;

supplying one or more different semi-finished products to the tire manufacturing line; changing a shaping tool configuration;

changing a manipulator configuration; and changing one or more processing parameters in the tire manufacturing line.

More in particular, the one or more processing parameters are one or more of the group comprising: pressure, temperature, speed, cutting dimension, shaping dimension and storage location.

In another embodiment the method comprises the steps of:

providing at least one module of the plurality of modules with an indicator;

issuing an alert via the indicator to a human operator indicating an upcoming switch over of the at least one module from the first manufacturing mode to the second manufacturing mode; and performing a manual operation at the at least one module to prepare for the upcoming switch over in response to the alert. The indicators can be used to urge the human operator to perform the manual operations in time so that the switch over can be performed or completed without delay. The indicator may for example be a warning light located in proximity to the at least one module or an audible alarm.

In another embodiment the method comprises the steps of:

providing a human machine interface; and issuing instructions to a human operator via the human machine interface to perform a manual operation in preparation for an upcoming switch over of at least one module of the plurality of modules from the first manufacturing mode to the second manufacturing mode. The human machine interface can provide more detailed information regarding the manual operation to be performed compared to the aforementioned indicator. The human machine interface may for example display which configuration change is required for the at least one module or it may ask the human operator for input regarding the specific settings of the at least one module.

In another embodiment the tire manufacturing line is a bead-apex manufacturing line. As mentioned earlier, switching over the bead-apex manufacturing line with the known method took at least thirty minutes. Tests have shown that the switch over time can be reduced to less than ten minutes, or even less than five minutes, using the method according to the present invention. Hence, considerable switch over time can be saved for switching over the bead-apex manufacturing line.

According to a second aspect, the invention provides a tire manufacturing line comprising a plurality of modules arranged in-line between an input side of the tire manufacturing line and an output side of the tire manufacturing line and a control unit that is operationally connected to the plurality of modules and that is configured for performing the steps of the method according to any one of the embodiments of the first aspect of the invention. It will be understood that tire manufacturing line, when operating according to the aforementioned method, has the same technical advantages as the method. These technical advantages will not be repeated hereafter.

According to a third aspect, the invention provides a computer program product comprising a non-transitory computer-readable medium holding instructions that, when executed by a processor, cause a control unit of a tire manufacturing line to perform the steps of the method according to any one of the embodiments of the first aspect of the invention. It will be understood that computer program product, when executed, has the same technical advantages as the method. These technical advantages will not be repeated hereafter.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
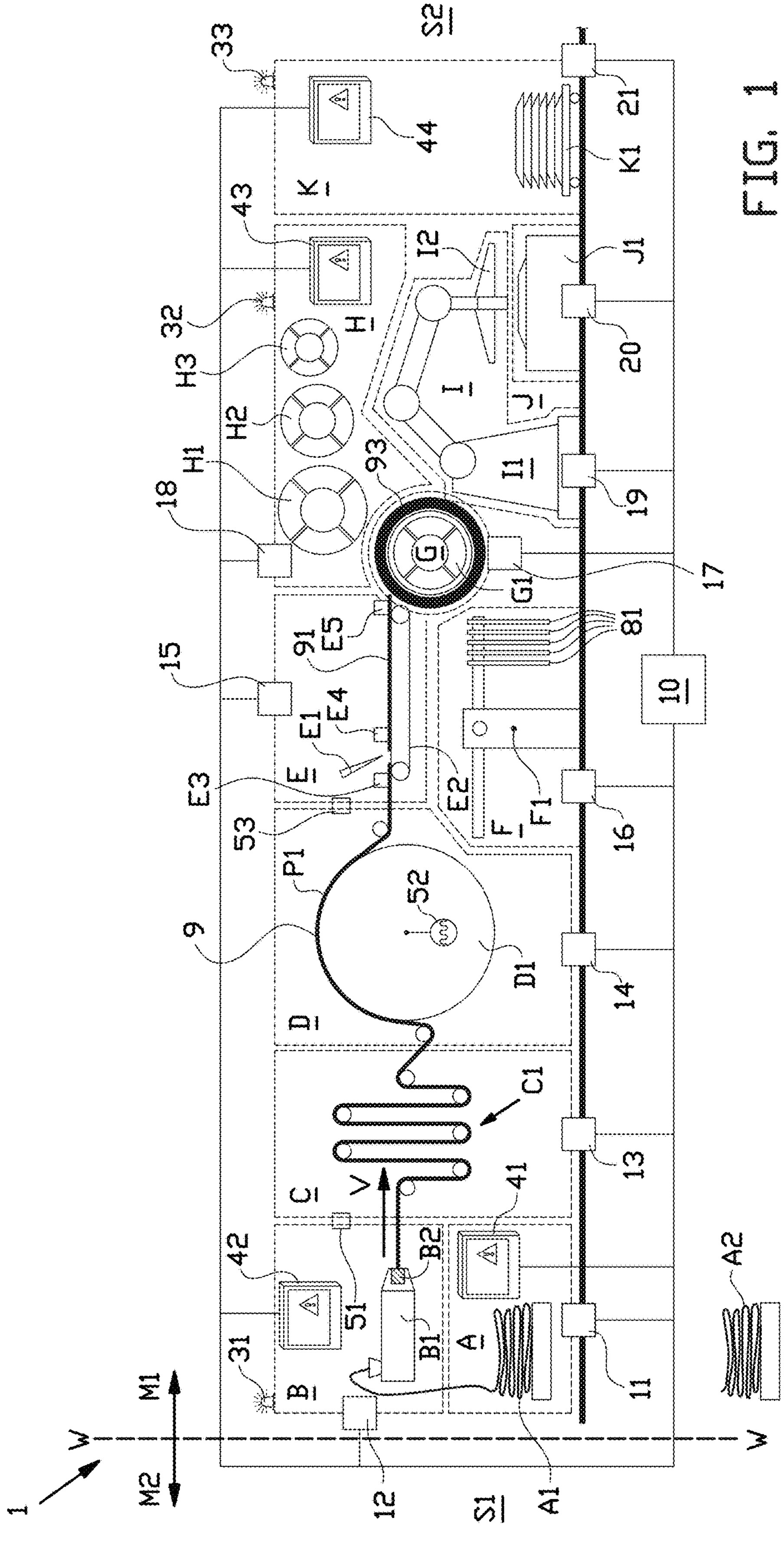
FIGS. 1-10 show a tire manufacturing line during the steps of a method for switching over said tire manufacturing line according to an exemplary embodiment of the invention.

FIG. 1 shows a schematic representation of a tire manufacturing line 1 according to an exemplary embodiment of the invention. The tire manufacturing line 1 is configured for producing, manufacturing and/or assembling tire components, in particular semi-finished tire components, in preparation for forming a green or unvulcanized tire.

In this particular example, the tire manufacturing line 1 is a bead-apex manufacturing line for producing, manufacturing and/or shaping apex strips, apex filler strips 91 (hereafter referred to as 'apexes') and for assembly of those with bead rings 81 (hereafter referred to as 'beads') to form a bead-apex assembly 93.

It will however be understood that the methodology as described hereafter may also be applied to any other tire manufacturing line, such as a pre-assembly or carcass manufacturing line for manufacturing assembling a liner, side walls, body plies and/or breaker plies, a belt-and-tread manufacturing line for manufacturing a belt-and-tread package, a side wall production line for manufacturing a side wall or a gum strip manufacturing line for manufacturing a gum strip.

The tire manufacturing line 1 comprises a plurality of modules A-K arranged between an input side S1 and an output side S2 of the tire manufacturing line 1. In this example, the plurality of modules A-K comprises:

- a raw material supply module A for receiving a stock of raw material A1 of a particular compound into the tire manufacturing line 1 at the input side S1;
- an extruder module B with an extruder B1 for receiving the raw material A1 from the raw material supply module A and for converting said raw material A1 into a strip 9 via an extruder die B2;
- a buffer module C with a buffer device C1, in this example a festooner, for buffer a buffer length of the strip 9 between any continuous and discontinuous operations in the tire manufacturing line 1;
- a cooling module D with a cooling device D1, in this example a cooling drum, for cooling the strip 9;
- a cutting module E with a cutting device E1 for cutting the strip 9 into individual tire components, in this example apexes 91, a conveyor E2 for conveying the strip 9 and/or the apexes 91 and one or more grippers E3, E4, E5 for positioning the strip 9 for cutting and for holding the ends of the apexes 91 during conveyance;
- a bead supply module F comprising a bead supply device F1, in this example a turret, for supplying beads 81 to the tire manufacturing line;
- a shaping module G with a shaping tool G1, in this example a bead-apex drum, for shaping a tire component, in this example an apex 91, into an annular shape around a bead 81 received from the bead-supply module F, thus obtaining an assembled bead-apex 93;
- a tool storage module H with one or more alternative shaping tools H1, H2, H3 for replacing the shaping tool G1 in the shaping module G;
- a manipulator module I with a manipulator I1, in this example a robot, carrying a gripper head 12 for engaging, picking-up, transferring and/or placing the tire components, in particular the bead-apex assembly 93, between the shaping module G and any one of the other modules J, K further downstream of said shaping module G;
- an inspection module J, in this example with an inspection platform J1, for checking or inspecting the tire components, for example the weight, shape, dimensions and/or uniformity of said tire components; and
- a storage module K for storing the tire components, for example on one or more storage carts K1.

In this exemplary embodiment, the raw material supply module A, the extruder module B, the buffer module C, the cooling module D, the cutting module E, the shaping module G, the manipulator module I, the inspection module J and the storage module K are arranged sequentially or in-line between the input side S1 and the output side S2. The bead supply module F and the tool storage module H are associated with the shaping module G in a position that can be considered off-the-line with respect to the modules A-E, G, I-K that are in-line.

The tire manufacturing line 1 further comprises a control unit 10 that is adapted, arranged, configured and/or programmed for controlling the operation of the tire manufacturing line 1. The tire manufacturing line 1 may be provided with one or more module controllers 11-21 which are operationally, electronically and/or functionally connected to the control unit 10 and the relevant controllable elements in the respective modules A-K to control the individual operation of said modules A-K.

The tire manufacturing line 1 may further be provided with one or more indicators 31-33, for example warning lights, operationally, electronically and/or functionally connected to the control unit 10 to indicate the status of certain modules B, H, K and/or one or more human machine interfaces 41-44, for example displays, for displaying status information and instructions to a human operator and/for allowing human machine interaction, in particular human operator input.

In this example, the tire manufacturing line 1 is further provided with one or more sensors 51, 52, 53 operationally, electronically and/or functionally connected to the control unit 10 for measuring various process parameters of the tire manufacturing line 1 and/or for detecting progress of the strip 9 and/or the tire components through said tire manufacturing line 1. Examples of sensors 51, 52, 53 are a height sensor, an optical sensor, an imaging sensor, an encoder or a radio frequency sensor.

A method for switching over the aforementioned tire manufacturing line 1 from a first manufacturing mode M1 to a second manufacturing mode M2 will now be described with reference to FIGS. 1-13.

FIGS. 1-10 schematically shows a switch over line W virtually dividing the tire manufacturing line 1 into a section that is operating in the first manufacturing mode M1 and a section that is operating in the second manufacturing mode M2. Note that the switch over line W progressively moves through the tire manufacturing line 1 from the input side S1 towards the output side S2.

As shown in FIG. 1, the switch over line W is at the input side S1 of the tire manufacturing line 1 with all of the modules A-K at side of the switch over line W that indicates that all of the modules A-K are operating in the first manufacturing mode M1. In the first manufacturing mode M1, the tire manufacturing line 1 is configured, set up, adapted and/or modified for manufacturing tire components, in this example bead-apexes or bead apex-assemblies 93, according to a first production order. Said first production order may have prescribed processing parameters, such as compounds, pressures, temperatures, speeds, cutting dimensions, shaping dimensions and storage locations, or prescribed configurations, such as the extruder configuration, the shaping tool configuration and the manipulator configuration.

In particular, in the first manufacturing mode M1, a raw material A1 of a first compound is being fed into the extruder B1 and is being converted into the strip 9. The strip 9 is fed out of the extruder B1 at a rate of travel V. The length of the strip 9 that is being extruded when the extruder B1 is operating in the first manufacturing mode M1 is referred to hereafter as the ‘first part’ 91 of the strip 9. The first part 91 of the strip 9 is buffered in the buffer module C, cooled in the cooling module D and subsequently cut into first apexes 91. The bead supply unit F is loaded with first beads 81. The first apexes 91 and the first beads 81 are combined and/or assembled at the shaping module G into first bead-apex assemblies 93. The first bead-apex assemblies 93 are transferred by the manipulator I1 to the inspection module J and—if found to be compliant—are subsequently transferred to the storage module K, to be stored on a first storage cart K1.

Figure 11:
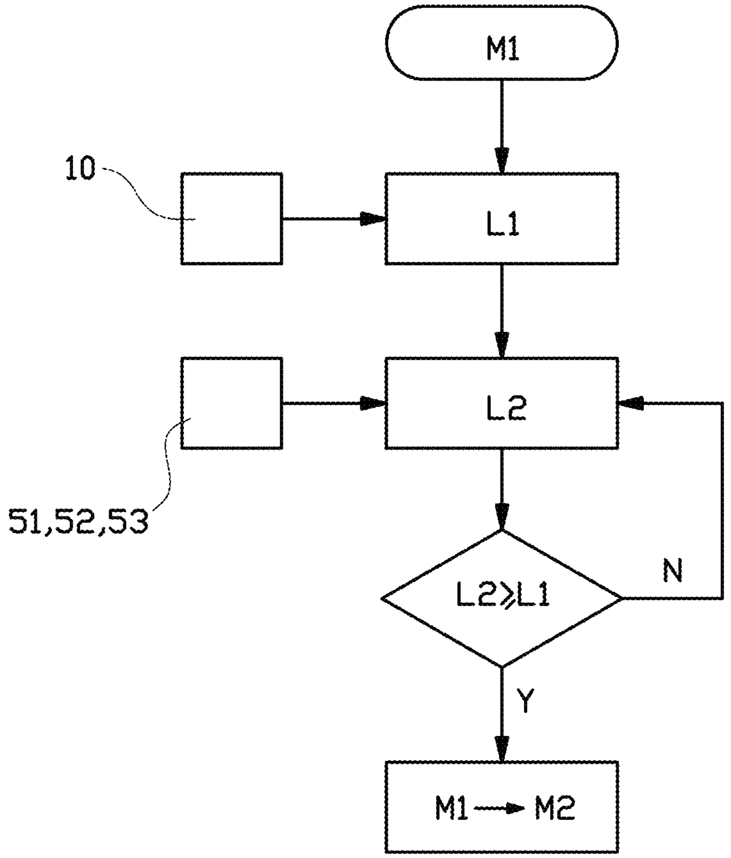
FIG. 11 shows a flow chart of the steps of a method for determining when to start the switch over of the tire manufacturing line according to FIGS. 1-10.

FIG. 11 shows a flow chart of a method for determining when to start switching over the tire manufacturing line 1 from the first manufacturing mode M1 to the second manufacturing mode M2. The first step is to calculate a theoretical length L1 of the first part P1 of the strip 9 that is required to complete the first production order. In particular, it can be calculated how many individual first apexes 91 still have to be cut from the first part P1 of the strip 9 to complete the first production order. Subsequently, it is determined, calculated or detected if an actual length L2 of the first part P1 of the strip 9 in the tire manufacturing line 1 is equal to or greater than the theoretical length L1. When the actual length L2 is smaller than the theoretical length L1, the tire manufacturing line 1 keeps operating in the first manufacturing mode M1, see arrow ‘N’. In the affirmative, see arrow ‘Y’, the switch over of the plurality of modules A-K from the first manufacturing mode M1 to the second manufacturing mode M2 is started.

Figure 6:
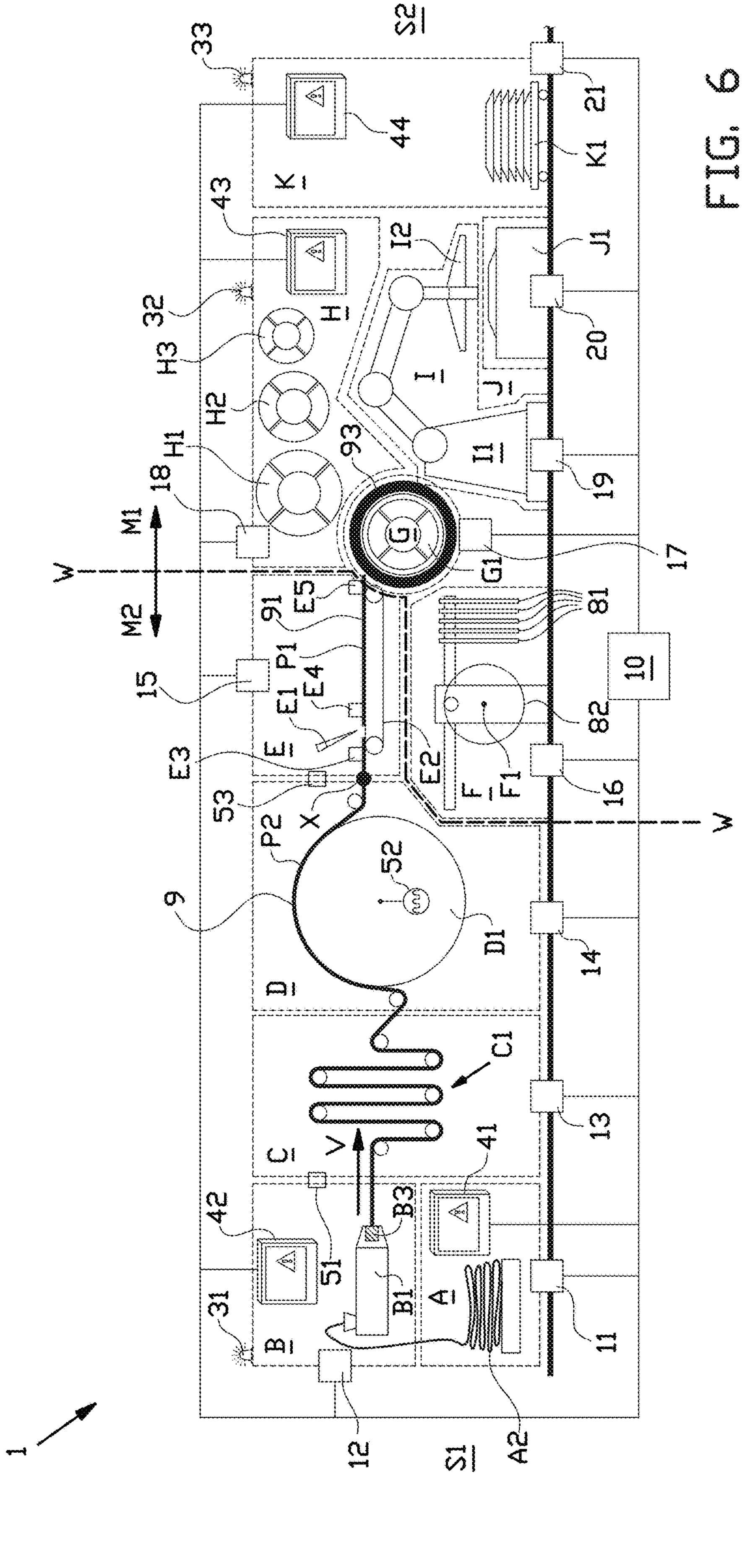
Figure 9:
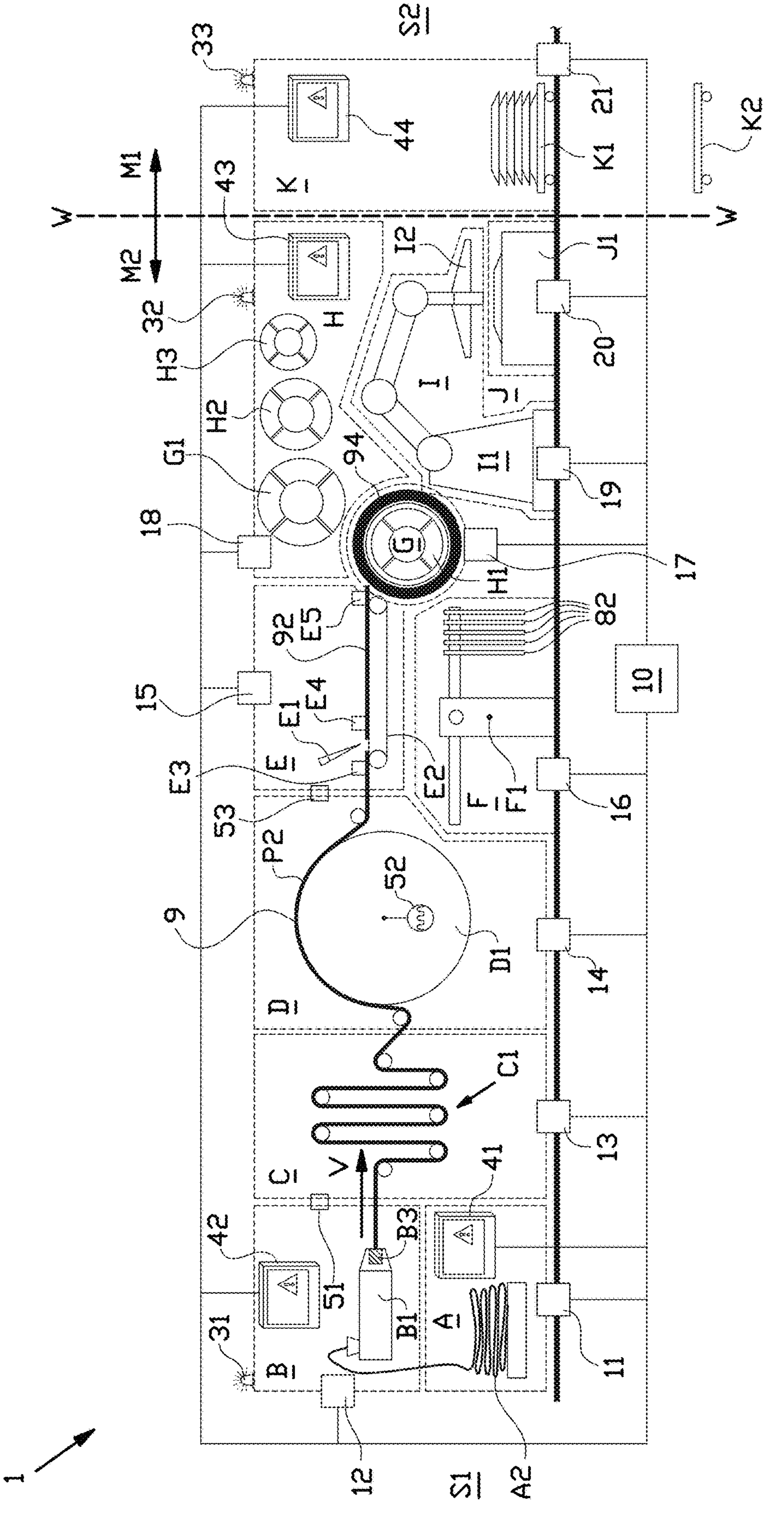

Ahead of the switch over, some preparations may already performed to prepare for the switch over. In particular, any manual preparation may already start when the tire manufacturing line 1 is still operating completely in the first manufacturing mode M1. The human operator may for example already obtain a raw material A2 of a second compound from stock, as shown in FIG. 1, and place it in a standby position in proximity to the raw material input module A. The human operator may also put an empty storage K2 in a standby position in proximity to the storage station K, as shown in FIG. 9. Moreover, another type of second beads 92 may already be provided at one of the arms of the bead-supply device F1 in the bead supply station F, as shown in FIG. 6. Alternatively, these operations may be performed ‘just-in-time’ as part of the switch over.

The human operator may be alerted to any of the above actions via the indicators 31-33 or the human machine interfaces 41-44.

Figure 2:
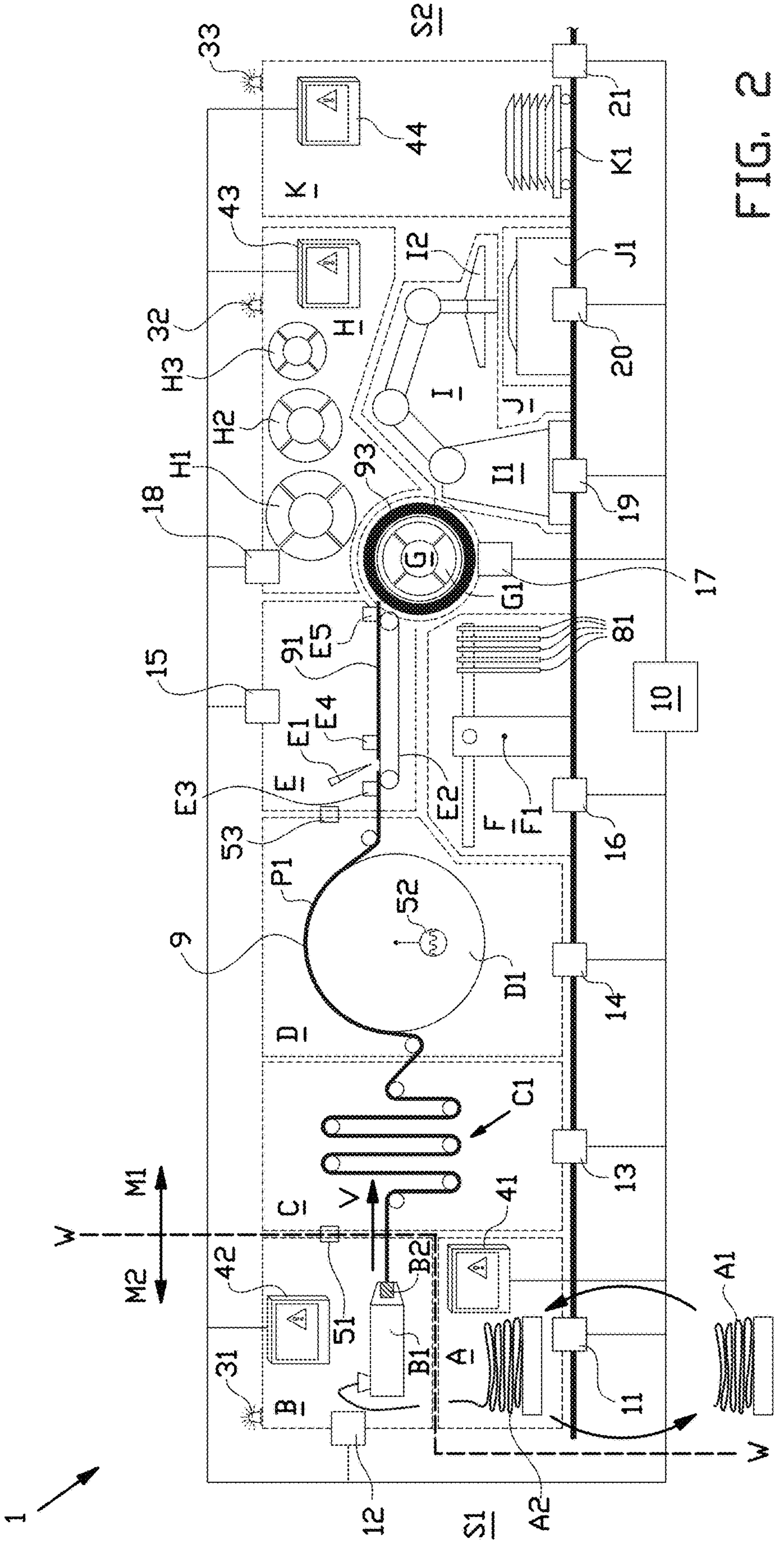

FIG. 2 shows the situation in which the raw material supply module A has been switched over by replacing the raw material A1 of the first compound with the raw material A2 of the second compound.

Figure 3:
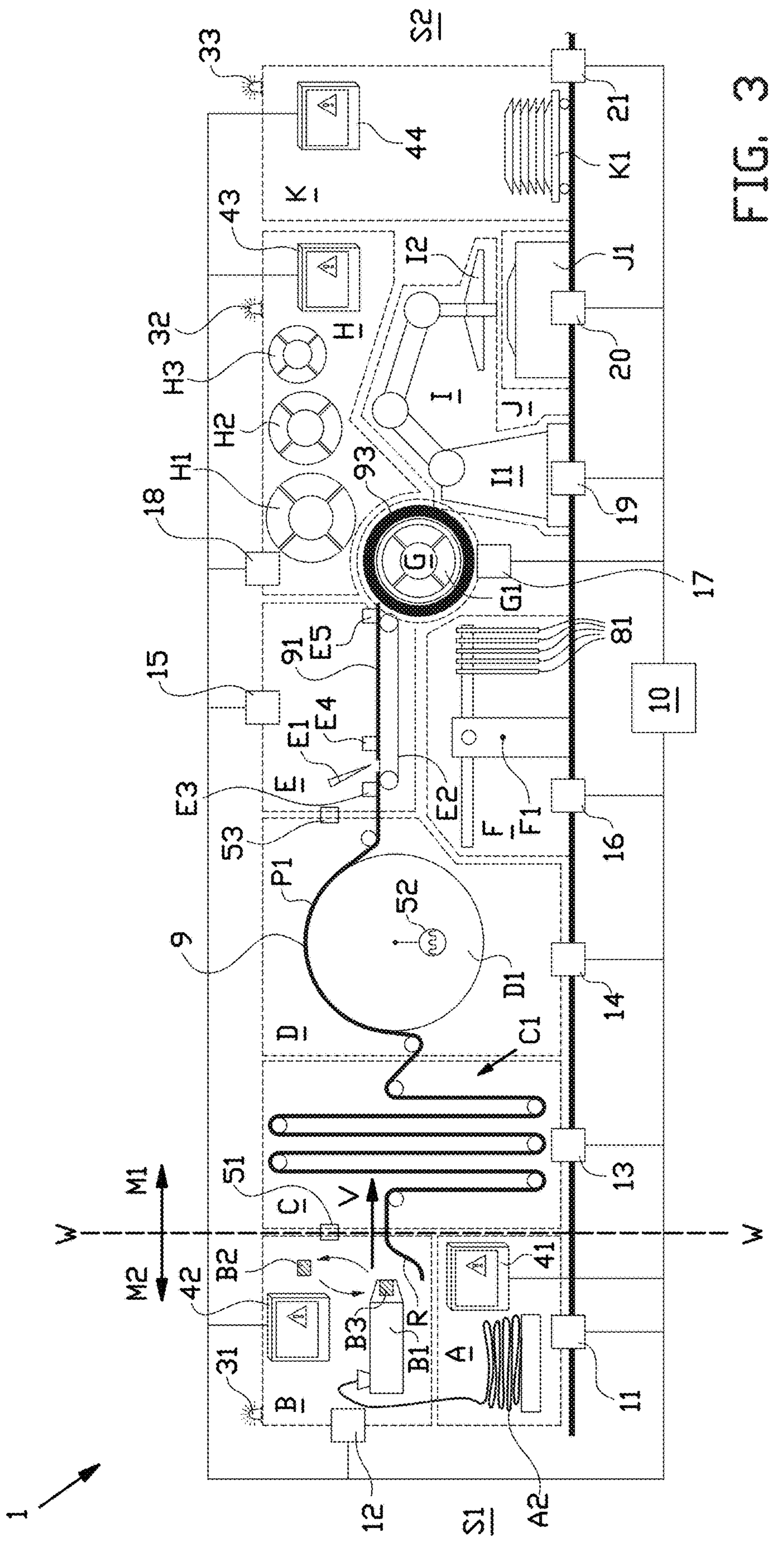

FIG. 3 shows the situation in which the extruder module B is switched over to the second manufacturing mode M2 by initiating a run-out procedure at the extruder B1. During such a run-out procedure the extruder die B2 is removed and any remaining material from the first compound is flushed, cleaned or forced out of the extruder B1. Once the extruder B1 is empty, the extruder die B2 may be replaced with an alternative extruder die B3, depending on the requirements of the second manufacturing mode M2, or the original extruder die B2 may be placed back. The extruder configuration and/or settings are adjusted for the second manufacturing mode M2, after which the extrusion process can be resumed. The run-out procedure may have resulted in a run-out section R at the first part P1 of the strip 9 which is unusable for production. Hence, said run-out section R may be removed, cut-off and/or discarded at the extruder module B.

Figure 4:
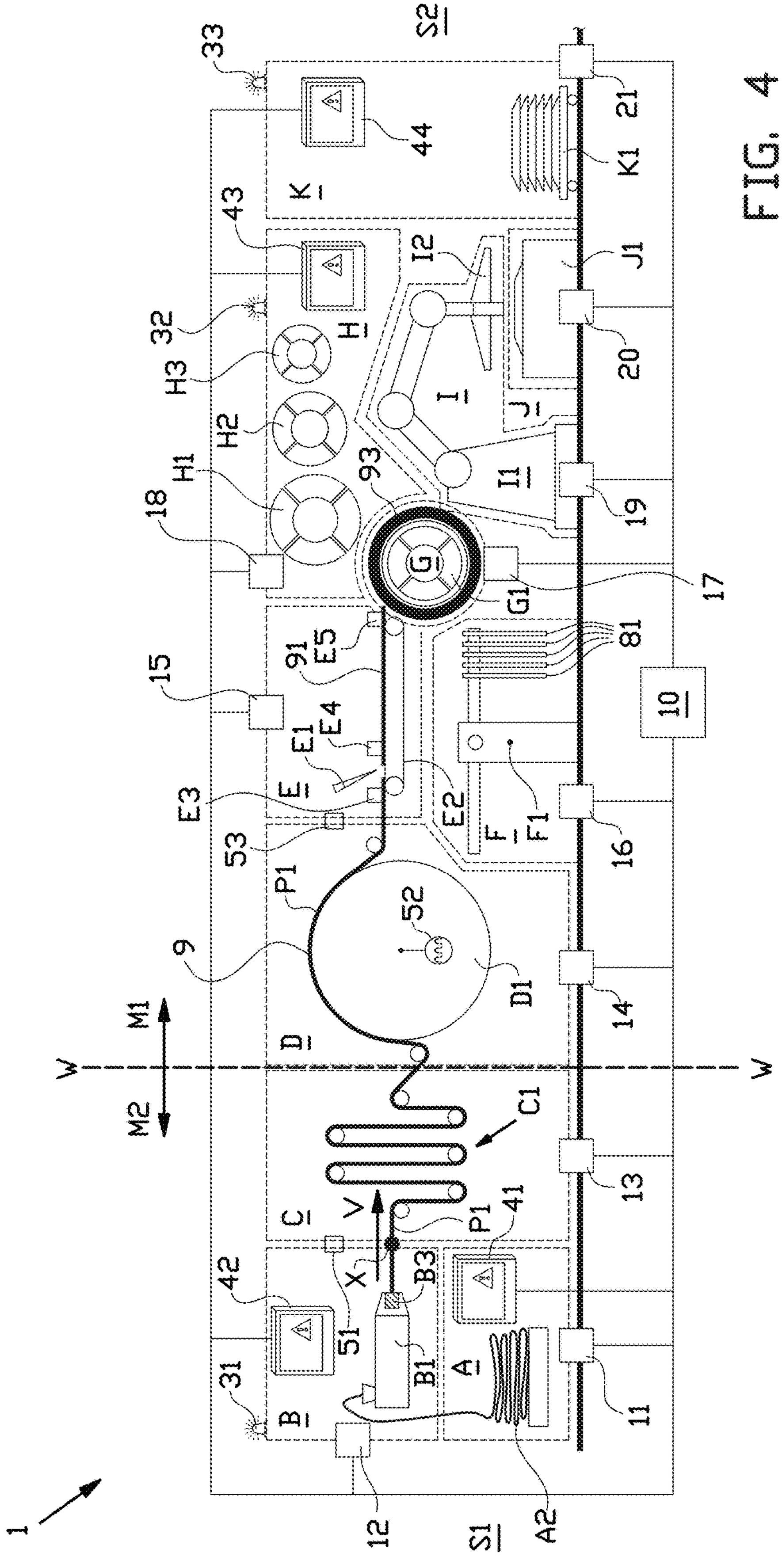

FIG. 4 shows the situation in which the extrusion process has been resumed and the extruder module B has now extruded a second part P2 of the strip 9. The second part P2 of the strip 9 has a leading end which is connected, coupled, joined or spliced to a trailing end of the first part P1 of the strip 9 to form a joint X in said strip 9. The first part P1 of the strip 9 may now conveniently pull the second part P2 of the strip 9 through the tire manufacturing line 1.

The strip 9, at the joint X, has an observable transition. In particular, there may be a height difference where the leading end of the second part P2 of the strip 9 and the trailing end of the first part P1 of the strip 9 are joined. Alternatively, there may be a transition in shape, for example a change in width, thickness or cross section, or there may be a material, color or texture transition between the first part P1 and the second part P2 of the strip 9.

In this example, when comparing FIGS. 3 and 4, it can be observed that the buffer module C is configured for buffering a buffer length of the first part P1 of the strip 9 in the buffer module C prior to the switch over the extruder module B from the first manufacturing mode M1 to the second manufacturing mode M2. Said buffered length of the first part P1 of the strip 9 is fed out to the modules D-K downstream of the buffer module C during the switch over the extruder module B from the first manufacturing mode M1 to the second manufacturing mode M2 such that the feeding of the first part P1 of the strip 9 to said modules D-K can be kept continuous or substantially continuous for as long as possible, despite the interruption at the extruder module B. Moreover, the buffer module C can keep the trailing end of the first part P1 of the strip 9 stationary at or near said extruder module B for forming the aforementioned joint X.

Figure 12:
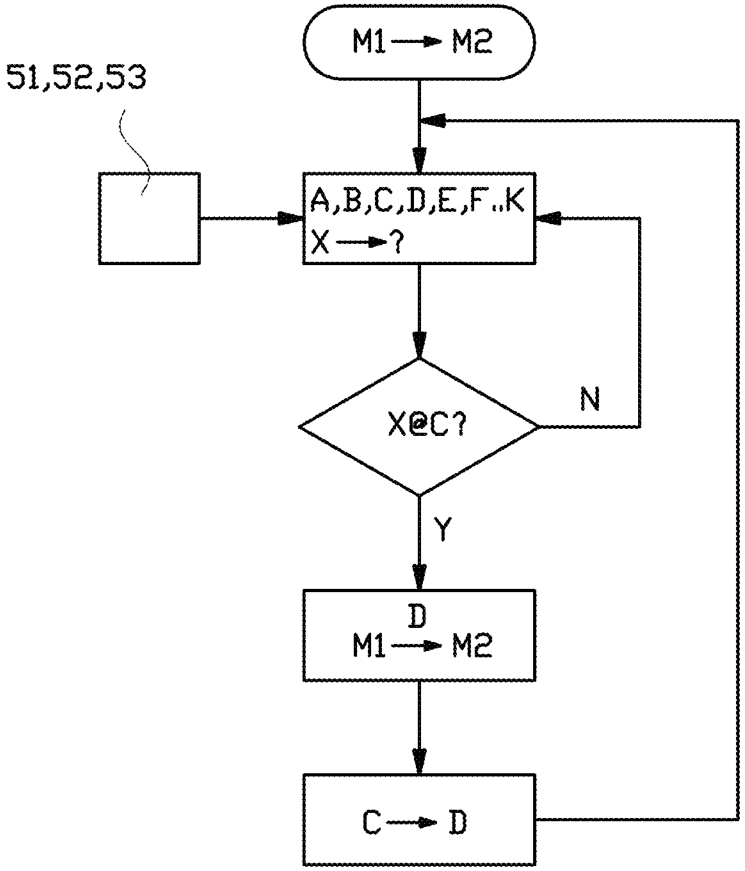
FIG. 12 shows a flow chart of the steps of the method for switching over the tire manufacturing line according to FIGS. 1-10.

As shown in the flow chart of FIG. 12, the progress of the joint X through the tire manufacturing line 1, as schematically represented by 'X->?' along the modules A-K, can be tracked using the input from one or more sensors 51-53. For example, in FIG. 4, the sensor 51 between the extruder module B and the buffer module C can detect the departure of the joint X from the extruder module B and/or the arrival of the joint X in the buffer module C, as schematically represented by 'X @ C'. In the affirmative, as shown with arrow 'Y', the buffer module C can be switched over to the second manufacturing mode M2, as schematically represented by 'C M1->M2', in response to the detected arrival of the joint X at said buffer module C. The steps of the flow chart can subsequently be repeated for any one of the subsequent modules, in this example the cooling module D, as schematically represented by 'C->D'.

Figure 13:
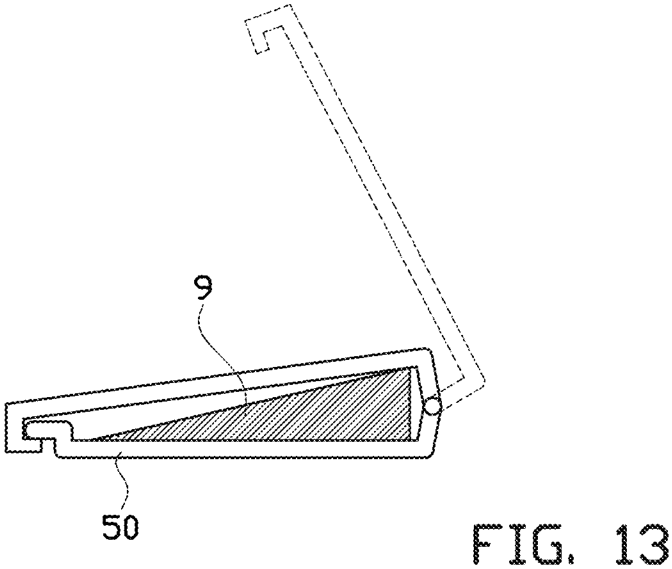
FIG. 13 shows a marker that can be used in the method for switching over the tire manufacturing line according to FIGS. 1-10.

To further aid the detection of the joint X, the strip 9 may optionally be provided with a marker 50 at or near the joint X, as shown in FIG. 13. The marker 50 may for example be provided with a clamping member for detachably clamping said marker 50 to the strip 9. The marker 50 may be passively detectable, i.e. by providing it with a contrasting color, or it may comprise actively detectable elements, such as an RFID tag. The marker 50 may be removed from the strip 9 after it has served it purpose, in order to be reused in a subsequent cycle of the method.

Alternatively, the progress of the joint X through the tire manufacturing line 1 can be calculated, for example based on a rate of travel V as measured by one or more encoders or by using a theoretical model of the tire manufacturing line 1. The progress may for example be determined based on an elapsed time since a certain event in the tire manufacturing line 1, for example the time of creation of the joint X.

By tracking or calculating the progress of the joint X through the tire manufacturing line 1, the modules A-K of the tire manufacturing line 1 can be progressively switched over. In particular, in any of FIGS. 2-8, one or more modules A-J that have been switched to the second manufacturing mode M2 can already be operated in said second manufacturing mode M2 while the other modules B-K that have not yet been switched over can simultaneously be operated in the first manufacturing mode M1. The principle for triggering the switching over of the modules A-K is similar for most of the modules A-K and is therefore not discussed hereafter in full detail.

Figure 5:
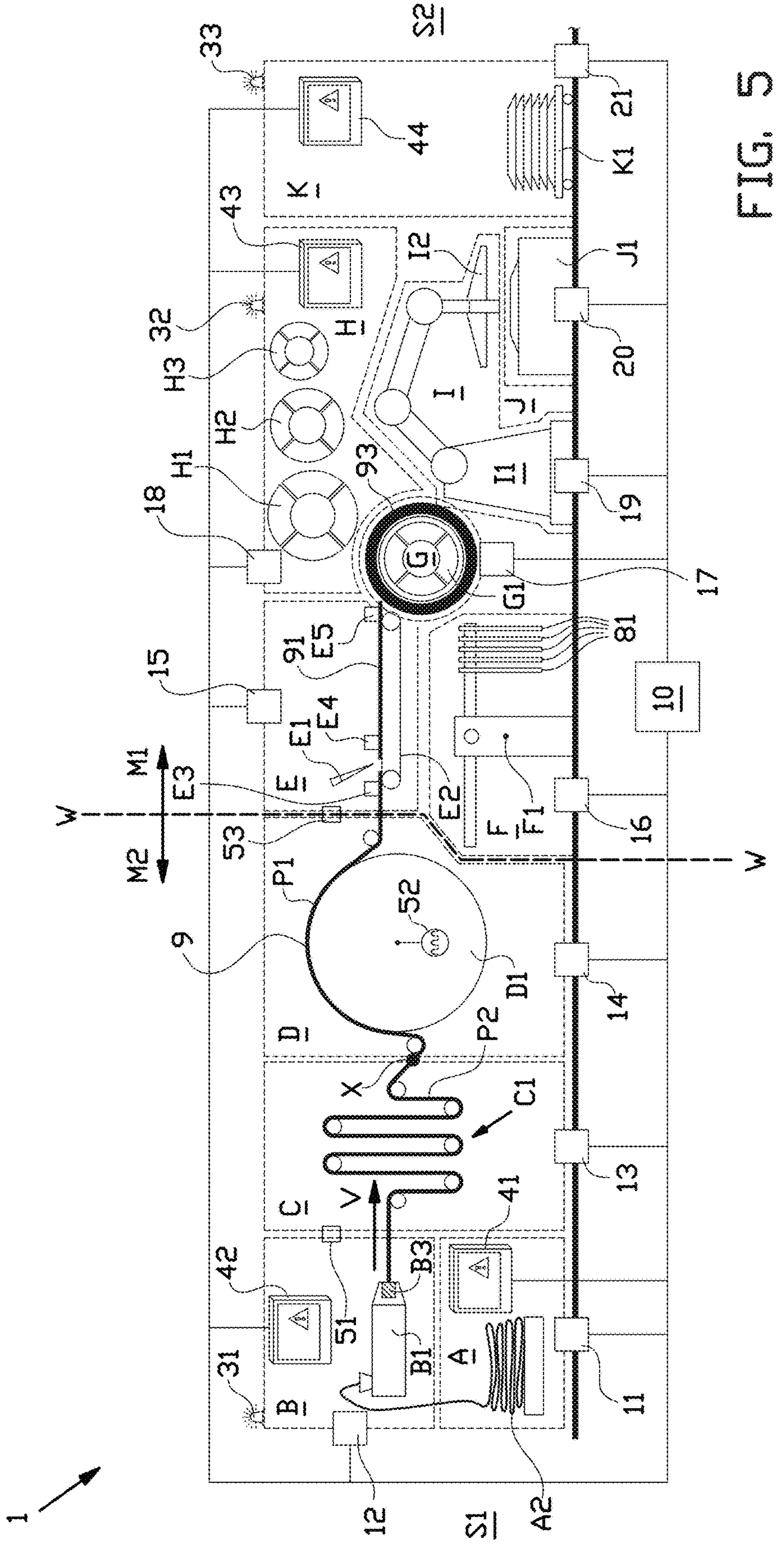

Regarding the modules E-K downstream of the cooling module D, the following is submitted:

FIG. 5 shows the situation in which the cooling module D is switched over to the second manufacturing mode M2, which may for example involve changing the speed of the cooling device D1 and/or the cooling temperature.

As shown in FIG. 6, the cutting module E is switched over when the joint X arrives at said cutting module E. It is noted that any remaining length of the first part P1 of the strip 9 that is still being processed in the cutting module E is processed according to the first manufacturing mode M1 to produce the first apex 91, after which the cutting module E can be switched over to the second manufacturing mode M2 to produce the second apex 92 from the second part P2 of the strip 9. The switch over of the cutting module E may for example involve reconfiguration of the cutting device E1, the conveyor E2 and/or the grippers E3, E4, E5, and/or adjustment of any of the cutting, gripping or conveying parameters.

The switch over of the cutting module E may further include a step of cutting out the joint X from the strip 9 to prevent that said joint X ends up in the first apex 91 or the second apex 92. Moreover, if the run-out section R has not been removed in the switch over of the extruder module B in FIG. 3, it may still be cut-out in the cutting module E in a similar manner to or together with the joint X.

Figure 7:
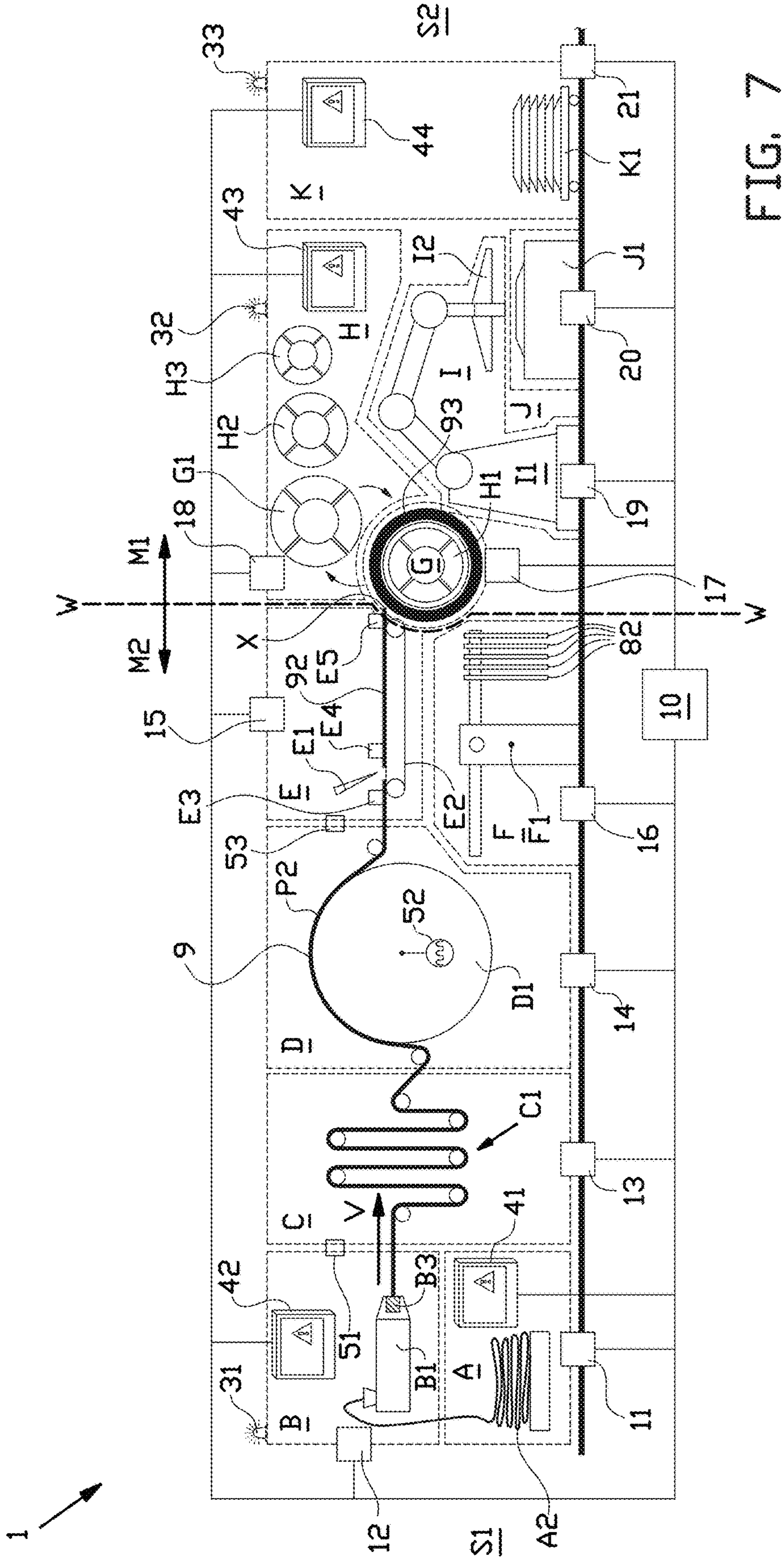

FIG. 7 shows the situation in which the bead supply module F has been switched over to the second manufacturing mode M2. As mentioned earlier, the second beads 92 may already be provided at the bead supply device F1, for example on one of the arms of the turret, to quickly switch the supply between the first beads 91 and the second beads 92. The bead-supply station F may be switched over simultaneously or in parallel with the cutting station E or prior to the switch over of the cutting station E to ensure that the second bead 92 is timely supplied to the shaping module G.

Figure 8:
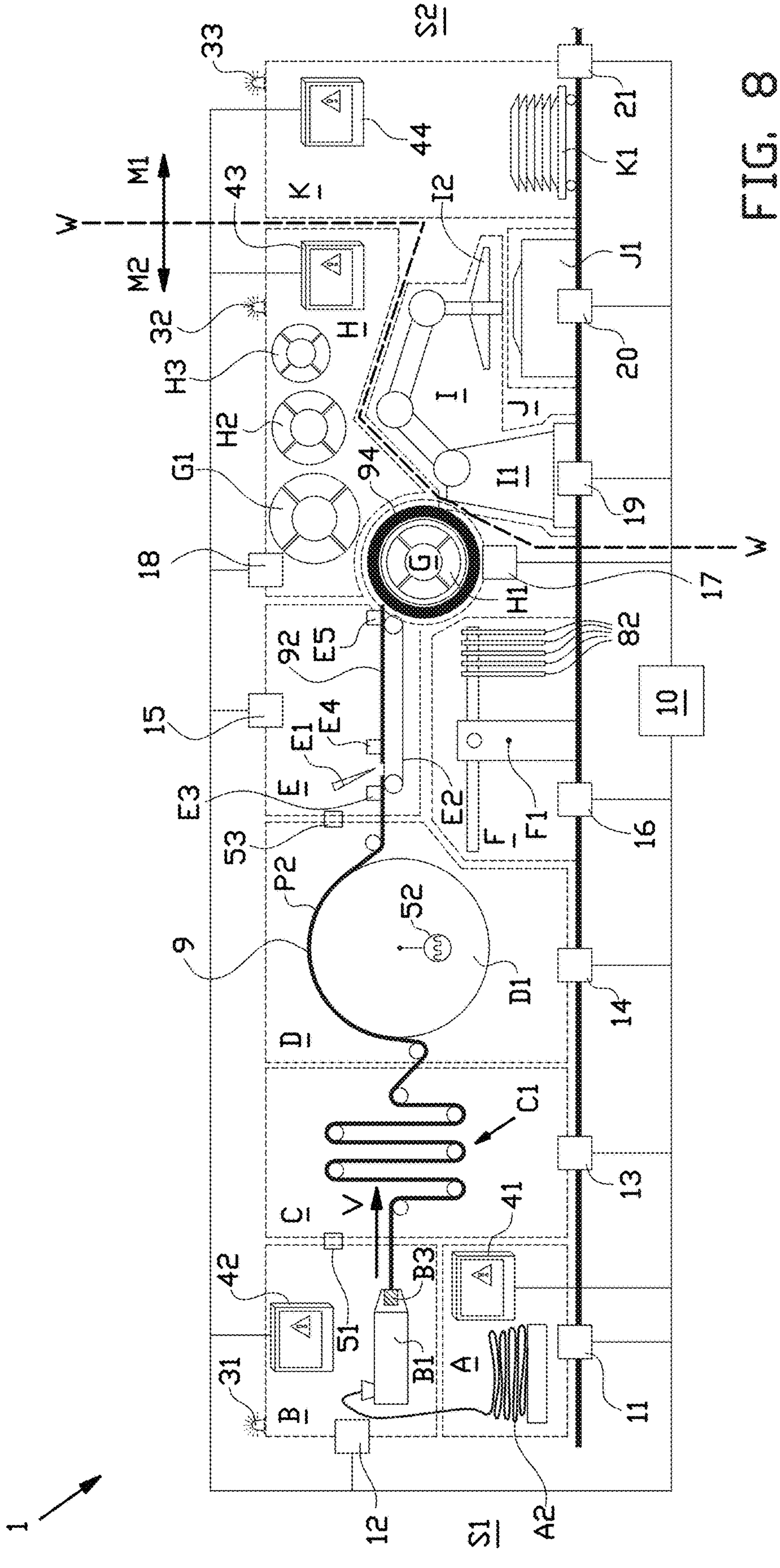

FIG. 8 shows the situation in which the shaping module G and the storage module H have been switched over to the second manufacturing mode M2. At this stage, the strip 9 has been cut into individual apexes 91, 92 and the progress of the joint X through the tire manufacturing line 1 can no longer be followed. Instead, the progress of the transition from the first apexes 91 to the second apexes 92 is tracked or calculated throughout the remaining modules G-K, for example based on the individual handling cycles of said individual apexes 91, 92 in the respective modules G-K. The control unit 10 may for comprise a counter starting with the number of first apexes 91 remaining in the tire manufacturing line 1 and subtracting one for each shaping action, each assembly action, each inspection action or each storage action until there are no first apexes 91 remaining in the respective module G-K and said module G-K can be switched over.

The switch over of the shaping module G may involve exchanging the shaping tool G1 in the shaping module G with one of the alternative shaping tools H1, H2, H3 in the tool storage module H. The tool storage module H is merely a storage for the alternative shaping tools H1, H2, H3. Hence, its operation does not change when switching over between manufacturing modes M1, M2. It may merely hold a different selection of shaping tools H1, H2, H3 during the different manufacturing modes M1, M2.

After switching over, the shaping module G is configured for shaping the second apexes 92 and for assembly said second apexes 92 with the second beads 82 into second bead-apex assemblies 94.

FIG. 9 shows the situation in which the manipulator module I and the inspection module J have been switched over to the second manufacturing mode M2. Said switch over may involve reconfiguration or recalibration of the manipulator I1 or the gripper head 12 thereof, and reconfiguration or recalibration of the inspection module J, for example to adjust for a different diameter of the second bead-apex assembly 94.

Figure 10:
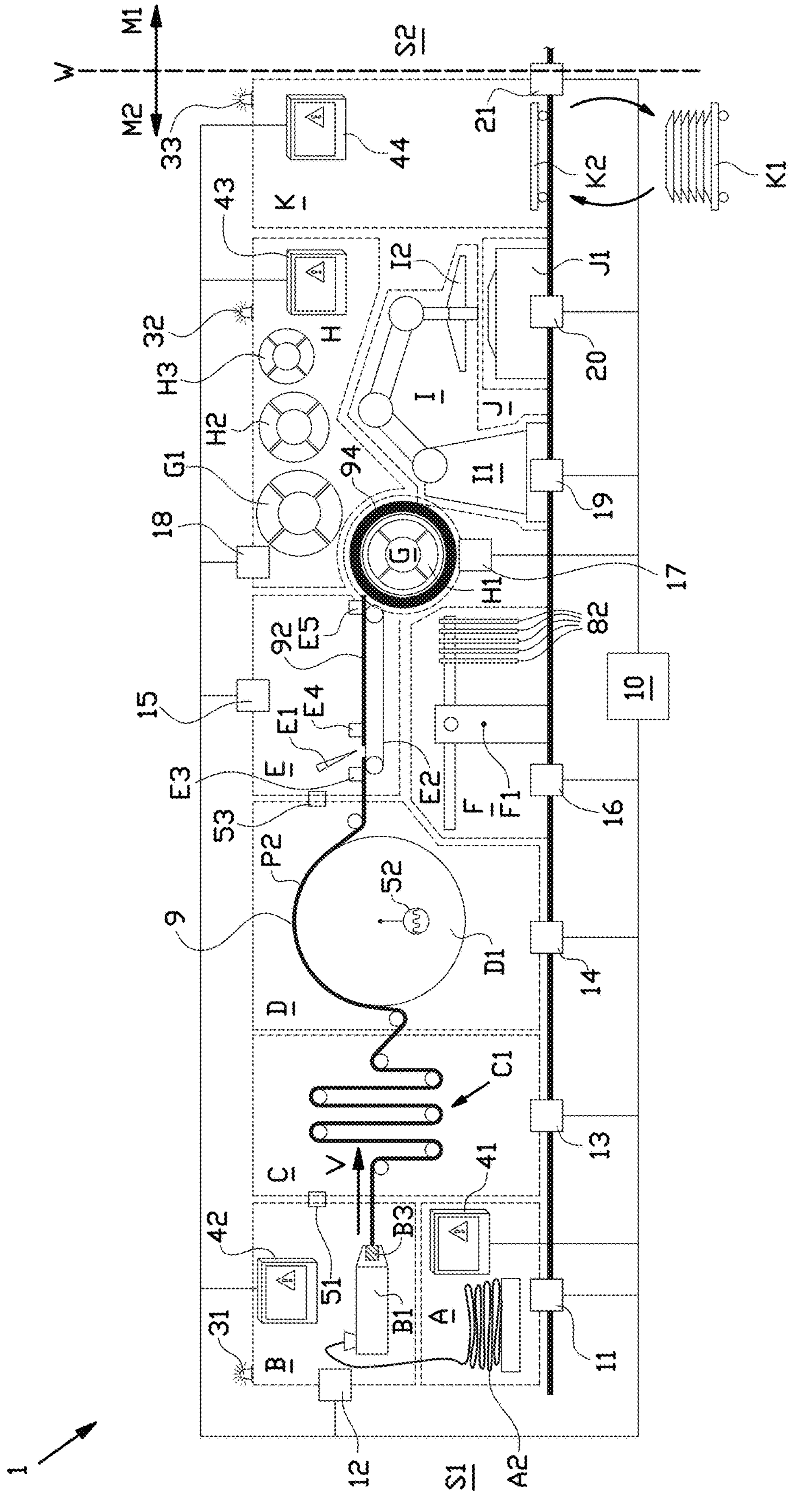

Finally, FIG. 10 shows the situation in which the storage module K has been switched over to the second manufacturing mode M2, for example by exchanging the full storage cart K1 with an empty storage cart K2 for receiving the second bead-apex assemblies 94 produced in the tire manufacturing line 1 during the second manufacturing mode M2.

Each of the aforementioned switch over operations may be performed automatically, semi-automatically or manually, depending on the specific requirements of the respective modules A-K. When the switch over is performed semi-automatically, a manual operation may be required before the switch over can be completed or the switch over needs to be triggered or approved manually.

In FIG. 10, all of the plurality of modules A-K have been switched over to the second manufacturing mode M2 and are operating in said second manufacturing mode M2. Hence, the tire manufacturing line 1 has been switched over completely to the second manufacturing mode M2.

It is however conceivable that the second manufacturing mode M2 does not require all of the modules A-K to be switched over, for example when one of the modules A-K is not used in the second manufacturing mode M2. In that case, said one module A-K does not need to be switched over and may remain in the first manufacturing mode M1. Hence, the scope of the invention is not necessarily limited to switching over all of the modules A-K of the tire manufacturing line 1. However, those modules A-E, G, I-K which are in-line and which are switched over, can be switched over progressively from the input side S1 towards the output side S2, as discussed above.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a method for switching over a tire manufacturing line from a first manufacturing mode to a second manufacturing mode, wherein the tire manufacturing line comprises a plurality of modules arranged in-line between an input side and an output side, wherein the method comprises the steps of:

- operating the plurality of modules in the first manufacturing mode;
- progressively switching over modules of the plurality of modules from the first manufacturing mode to the second manufacturing mode;
- operating modules in said second manufacturing mode while simultaneously operating modules in the first manufacturing mode; and
- operating the plurality of modules in the second manufacturing mode after the plurality of modules has been switched over to the second manufacturing mode.

The invention further relates to a tire manufacturing line and a computer program product configured for performing the aforementioned method.

LIST OF REFERENCE NUMERALS

| | |
|---|---|
| 1 | tire manufacturing line |
| 10 | control unit |
| 11-21 | module controllers |
| 31-33 | indicators |
| 41-44 | human machine interfaces |
| 50 | marker |
| 51-53 | sensors |
| 81 | first bead |
| 82 | second bead |
| 9 | strip |
| 91 | first apex |
| 92 | second apex |
| 93 | first bead-apex assembly |
| 94 | second bead-apex assembly |
| A | raw material input module |
| A1 | first compound of raw material |
| A2 | second compound of raw material |
| B | extruder module |
| B1 | extruder |
| B2 | first die |
| B3 | second die |
| C | buffer module |
| C1 | buffer device |
| D | cooling module |
| D1 | cooling device |
| E | cutting module |
| E1 | cutting device |
| E2 | conveyor |
| E3 | first gripper |
| E4 | second gripper |
| E5 | third gripper |
| F | bead supply module |
| F1 | bead supply device |
| G | shaping module |
| G1 | shaping tool |
| H | tool storage module |
| H1 | alternative shaping tool |
| H2 | further alternative shaping tool |
| H3 | further alternative shaping tool |
| I | manipulator module |
| I1 | manipulator |
| I2 | gripper head |
| J | inspection module |
| J1 | inspection platform |
| K | storage module |
| K1 | storage cart |
| L1 | theoretical length |
| L2 | actual length |
| M1 | first manufacturing mode |
| M2 | second manufacturing |
| P1 | first part of the strip |
| P2 | second part of the strip |
| R | run-out section |
| S1 | input side |
| S2 | output side |
| V | rate of travel |
| W | switch over line |
| X | joint |

The invention claimed is:

1. A method for switching over a tire manufacturing line from a first manufacturing mode to a second manufacturing mode, the tire manufacturing line including a plurality of modules arranged in-line between an input side and an output side of the tire manufacturing line, the method comprising the steps of:

- operating the plurality of modules in the first manufacturing mode;
- progressively, from the input side towards the output side, switching over one or more modules of the plurality of modules from the first manufacturing mode to the second manufacturing mode; and
- operating the one or more modules that have been switched to the second manufacturing mode in said second manufacturing mode while simultaneously operating one or more modules that have not yet been switched over in the first manufacturing mode, wherein the tire manufacturing line is configured for converting a strip into individual tire components, wherein the method further comprises the steps of:

providing a joint in the strip between a first part of the strip that is to be processed by one or more modules of the plurality of modules operating in the first manufacturing mode and a second part of the strip that is to be processed by one or more modules of the plurality of modules operating in the second manufacturing mode; and switching over at least one module of the plurality of modules from the first manufacturing mode to the second manufacturing mode prior to or at arrival of said joint in said at least one module.

2. The method according to claim 1, wherein the method further comprises the step of:

operating all of the plurality of modules in the second manufacturing mode after all of the plurality of modules has been switched over to the second manufacturing mode.

3. The method according to claim 1, wherein the method further comprises the steps of:

calculating progress of the joint through the tire manufacturing line from the input side towards the output side; and switching over the at least one module from the first manufacturing mode to the second manufacturing mode in response to the calculated progress.

4. The method according to claim 3, wherein the progress is calculated based on a rate of travel of the strip through the tire manufacturing line from the input side towards the output side.

5. The method according to claim 3, wherein the progress is calculated based on an elapsed time after an event in the tire manufacturing line.

6. The method according to claim 5, wherein the event is a time of creation of the joint.

7. The method according to claim 5, wherein the event is related to the progress of joint through the tire manufacturing line upstream of the at least one module.

8. The method according to claim 1, wherein the method further comprises the steps of:

tracking progress of the joint through the tire manufacturing line from the input side towards the output side; and switching over the at least one module from the first manufacturing mode to the second manufacturing mode in response to the tracked progress.

9. The method according to claim 1, wherein the method further comprises the steps of:

providing one or more sensors for detecting the progress of the joint through the tire manufacturing line from the input side towards the output side.

10. The method according to claim 9, wherein the one or more sensors comprises at least one of a height sensor, an optical sensor, an encoder, an imaging sensor or a radio frequency sensor.

11. The method according to claim 9, wherein the method further comprises the steps of:

adding a marker to the strip at or near the joint; and tracking the progress of the joint through the tire manufacturing line by detecting the marker.

12. The method according to claim 11, wherein the method further comprises the steps of:

removing the marker from the strip; and adding the marker to another strip during a subsequent cycle of the method.

13. The method according to claim 1, wherein the strip, at the joint, has one of a height transition, a shape transition, a material transition, a color transition, a texture transition or another observable transition.

14. The method according to claim 1, wherein the plurality of modules comprises an extruder module for extruding the strip, wherein the method comprises the steps of:

operating the extruder module in the first manufacturing mode to extrude the first part of the strip;

switching over the extruder module from the first manufacturing mode to the second manufacturing mode; and operating the extruder module in the second manufacturing mode to extrude the second part of the strip.

15. The method according to claim 14, wherein the method further comprises the steps of:

running out the first part of the strip from the extruder module, wherein the first part of the strip comprises a run-out section as a result of said running out; and at least partially removing the run-out section from the first part of the strip prior to joining the first part of the strip with the second part of the strip.

16. The method according to claim 14, wherein the plurality of modules comprises a buffer module downstream of the extruder module, wherein the method comprises the steps of:

buffering a buffer length of the first part of the strip in the buffer module prior to the switch over the extruder module from the first manufacturing mode to the second manufacturing mode; and feeding out at least a part of the buffer length of the first part of the strip from the buffer module to one or more modules of the plurality of modules downstream of the buffer module during the switch over the extruder module from the first manufacturing mode to the second manufacturing mode.

17. The method according to claim 1, wherein the plurality of modules comprises a cutting module, wherein the method further comprises the steps of:

cutting the strip into individual tire components from the first part of the strip at the cutting module;

switching over the cutting module from the first production mode to the second production mode; and cutting the strip into individual tire components from the second part of the strip at the cutting module.

18. The method according to claim 17, wherein the method further comprises the step of:

cutting out the joint from the strip.

19. The method according to claim 17, wherein the first part of the strip comprises a run-out section adjacent to the joint, wherein the method further comprises the step of:

at least partially cutting out the run-out section at the cutting module.

20. The method according to claim 1, wherein the method further comprises the steps of:

calculating a theoretical length of the first part of the strip that is required to complete a first production order of tire components manufactured in the tire manufacturing line from said first part of the strip; and starting the switch over of the plurality of modules from the first manufacturing mode to the second manufacturing mode after an actual length of the first part of the strip in the tire manufacturing line is equal to or greater than the theoretical length.

21. The method according to claim 1, wherein one or more modules of the plurality of modules are switched over from the first manufacturing mode to the second manufacturing mode automatically.

22. The method according to claim 1, wherein one or more modules of the plurality of modules are switched over from the first manufacturing mode to the second manufacturing mode semi-automatically.

23. The method according to claim 1, wherein one or more modules of the plurality of modules are switched over from the first manufacturing mode to the second manufacturing mode manually.

24. The method according to claim 1, wherein switching over the plurality of modules comprises one or more of the following steps:

supplying one or more different compounds to an extruder;

changing an extruder configuration;

supplying one or more different semi-finished products to the tire manufacturing line;

changing a shaping tool configuration;

changing a manipulator configuration; and changing one or more processing parameters in the tire manufacturing line.

25. The method according to claim 24, wherein the one or more processing parameters are one or more of the group comprising: pressure, temperature, speed, cutting dimension, shaping dimension and storage location.

26. The method according to claim 1, wherein the method comprises the steps of:

providing at least one module of the plurality of modules with an indicator;

issuing an alert via the indicator to a human operator indicating an upcoming switch over of the at least one module from the first manufacturing mode to the second manufacturing mode; and performing a manual operation at the at least one module to prepare for the upcoming switch over in response to the alert.

27. The method according to claim 1, wherein the method comprises the steps of:

providing a human machine interface; and issuing instructions to a human operator via the human machine interface to perform a manual operation in preparation for an upcoming switch over of at least one module of the plurality of modules from the first manufacturing mode to the second manufacturing mode.

28. The method according to claim 1, wherein the tire manufacturing line is a bead-apex manufacturing line.

29. A tire manufacturing line comprising a plurality of modules arranged in-line between an input side of the tire manufacturing line and an output side of the tire manufacturing line and a control unit that is operationally connected to the plurality of modules and that is configured for performing the steps of the method according to claim 1.

30. A non-transitory computer-readable medium having instructions stored therein that, when executed by a processor, cause a control unit of a tire manufacturing line to perform the steps of the method according to claim 1.

* * * * *